United States Patent
Ratz et al.

[11] Patent Number: 5,848,136
[45] Date of Patent: Dec. 8, 1998

[54] STATE MACHINE AND METHOD FOR MONITORING AND CONTROLLING OPERATING MODES IN A COMPUTER-CONTROLLED TELEPHONY INSTRUMENT

[75] Inventors: Roger W. Ratz, Naperville; Randy D. Pfeifer, Warrenville, both of Ill.

[73] Assignee: NCR Corporation, Dayton, Ohio

[21] Appl. No.: 770,283

[22] Filed: Dec. 20, 1996

[51] Int. Cl.$^6$ .................................................. H04M 11/00
[52] U.S. Cl. ................................... 379/110.01; 379/90.01; 379/387; 379/93.06
[58] Field of Search .................. 379/90.01, 93.05–93.07, 379/93.14, 93.37, 110.01, 398, 406, 419, 441, 442, 387, 400, 410

[56] References Cited

U.S. PATENT DOCUMENTS

| | | |
|---|---|---|
| 4,215,252 | 7/1980 | Onufry, Jr. . |
| 4,860,342 | 8/1989 | Danner ............................... 379/110.01 |
| 5,014,307 | 5/1991 | Joffe et al. ............................ 379/410 |
| 5,263,079 | 11/1993 | Umemoto ............................... 379/58 |
| 5,349,640 | 9/1994 | Dunn et al. ........................... 379/93.06 |
| 5,381,474 | 1/1995 | Lahdemaki et al. .................... 379/410 |
| 5,416,829 | 5/1995 | Umemoto .................................. 379/58 |
| 5,420,921 | 5/1995 | Lahdemaki ............................. 379/407 |
| 5,452,289 | 9/1995 | Sharma et al. ......................... 370/32.1 |

*Primary Examiner*—Wing F. Chan
*Attorney, Agent, or Firm*—William A. Munck; David H. Hitt

[57] ABSTRACT

There is disclosed a telephone instrument having controller and audio unit portions coupled together by a control bus and a user data bus having four audio states. The audio unit portion comprises a state machine that allows operating modes of the telephony instrument to be monitored and controlled. The state machine places the user data bus in a first predetermined state and the controller portion responds by placing the control bus in a selected state. The state machine detects the selected state and, in response thereto, places the user data bus in a second predetermined state. The second predetermined state indicates whether the first predetermined state was intended to be one of the four audio states or one of at least two mode control states. The user data bus and the control bus cooperate to provide a sequential output having at least six states, thereby allowing the operating modes to be monitored and controlled without modifying the bus drive circuitry.

20 Claims, 6 Drawing Sheets

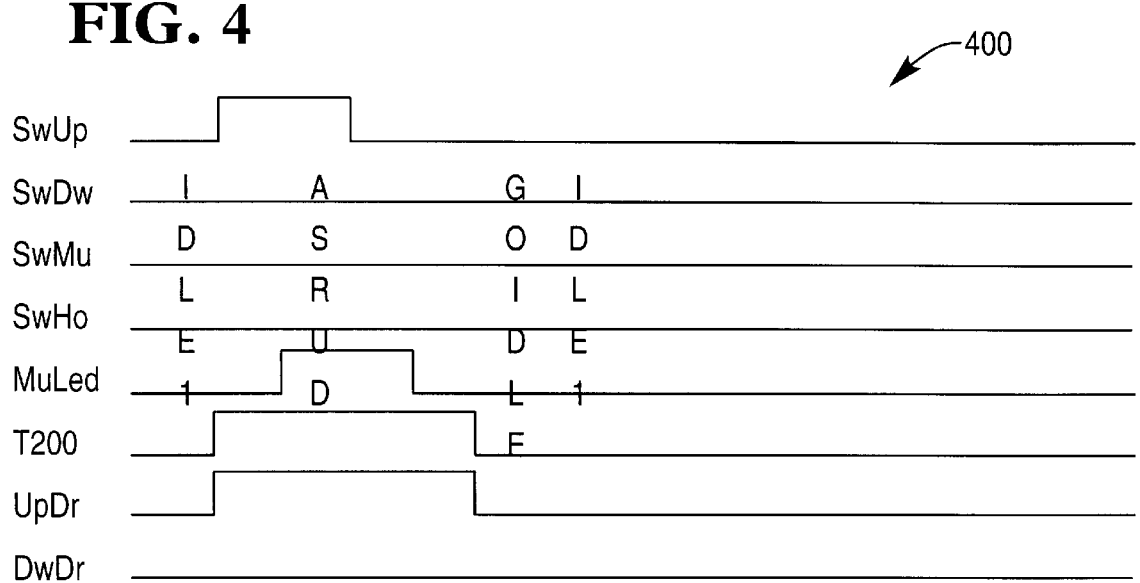
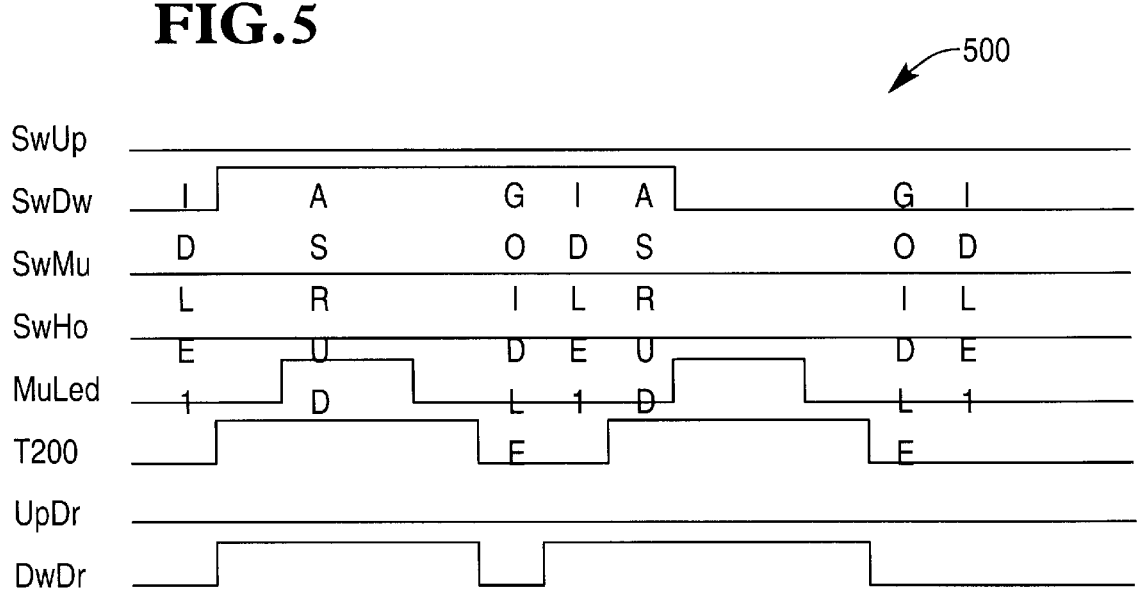

STATE MACHINE AND METHOD FOR MONITORING AND CONTROLLING OPERATING MODES IN A COMPUTER-CONTROLLED TELEPHONY INSTRUMENT

TECHNICAL FIELD OF THE INVENTION

The present invention is directed, in general, to telephony systems and methodologies and, more specifically, to a system and method for monitoring and changing operating modes (such as enabling or disabling echo cancellation) in a computer-controlled telephony instrument.

BACKGROUND OF THE INVENTION

The commercial availability of more efficient, reliable and cost effective computers has enabled businesses and individuals to rely on the same, and related peripheral devices, to meet their information and processing needs. The immeasurable gains in technology experienced by the computer industry have enabled these computers and devices to be standardly equipped with interchangeable and replaceable parts and devices. Interchangeability is typically facilitated through expansion slots, couplable interfaces or the like.

Today's computers, as well as many peripheral devices, may therefore be upgraded, leaving substantially all of an established processing base intact. It is often desirable therefore to introduce a more advanced, or "next generation," part or device that is backwards compatible with the established processing base. A problem arises however when only a portion of an existing part or device to be replaced or upgraded does not include a suitable expansion slot, couplable interface, etc.

In one example, a telephony board (installable within a conventional personal computer ("PC")) and an audio unit (external to and couplable with the PC and board via a data bus) collectively represent an established base. There is a desire to upgrade the audio unit, which previously had only conventional hands-free capability, to include optional handset capability. To incorporate such capability into the audio unit, certain information must be communicated to the telephony board. Unfortunately, according to the existing interface between the board and the prior audio unit, there is insufficient circuitry in the data bus to accommodate this additional functionality.

There exists a need in the art to facilitate backwards compatibility with this established processing base, and thus to enable the data bus to be extendable to allow the same to achieve a greater number of states than would otherwise be possible.

SUMMARY OF THE INVENTION

To address the above-discussed deficiencies of the prior art, the present invention provides, for use with a telephony instrument having controller and audio unit portions with associated bus drive circuitry, the controller and audio unit portions couplable together by a user data bus having at least four normal states and an at least two state control bus, a state machine and method, associated with the audio unit portion, that allows operating modes of the telephony instrument to be monitored and controlled. The system includes: (1) a first circuit that places the user data bus in a first predetermined state, the controller portion responding to the predetermined state by placing the control bus in a selected state and (2) a second circuit, associated with the first circuit, that detects a presence of the selected state and, in response thereto, places the user data bus in a second predetermined state, the second predetermined state indicating whether the first predetermined state was intended to be a selected one of the four normal states and one of at least two mode-controlling alternate states, the state machine thereby allowing the user data bus and the control bus to cooperate to provide an at least six state sequential output to allow the operating modes to be monitored and controlled without modifying the bus drive circuitry.

The present invention therefore allows the user data bus and the control bus to provide, in essence, an "extension" to the user data bus. The "extension" allows the user data bus to achieve a greater number of states than would otherwise be possible. By extending the capabilities of the user data bus, the present invention allows the telephony instrument to include new features without having to redesign either the user data bus or the bus drive circuitry (perhaps interrupt driving circuitry) that is already present within the telephony instrument. In a four-state user data bus, up to three mode-controlling alternate states are possible, inasmuch as one of the alternate states is reserved to indicate whether the second circuit is operating with normal states or alternate states.

In one embodiment of the present invention, the telephony instrument further has an echo cancellation circuit associated therewith and the at least two mode-controlling alternate states indicate whether the echo cancellation circuit is or should be enabled. In a related embodiment, the at least two mode-controlling alternate states include echo cancellation enable and echo cancellation disable states.

In an embodiment to be illustrated and described, the present invention allows status information or commands concerning enablement or disablement of the echo cancellation circuit to be communicated between the controller and the audio unit portions of the telephony instrument without redesigning the hardware of the telephony instrument. Alternatively, other circuitry may be monitored or controlled via the present invention.

In one embodiment of the present invention, the controller portion is embodied in a peripheral card couplable to a computer system to allow the computer system to control the controller portion. The computer system may advantageously be a personal computer ("PC") having an open architecture capable of readily accepting peripheral cards. Of course, the controller need not be computer controlled, or software-controlled, for that matter. In one embodiment of the present invention, the control bus is employed to control a status light associated with the audio unit portion. The control bus can be engaged in another capacity, however.

In one embodiment of the present invention, the four normal states are: (1) mute on/off, (2) volume increase, (3) volume decrease and (4) idle. In the embodiment to be illustrated and described, these four states are associated with a precursor to the telephony instrument employing the present invention.

In one embodiment of the present invention, the first predetermined state is a mute on/off state and the second predetermined state is the mute on/off state to indicate that the first predetermined state was intended to be the mute on/off state. Therefore the mute on/off state is used to indicate normal/alternate operation. Of course, any of the four normal states may be so employed.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which like numbers designate like objects and in which:

FIG. 4 illustrates an exemplary timing diagram illustrating an up switch scenario according to the present invention;

FIG. 5 illustrates an exemplary timing diagram illustrating a down switch with repeat scenario according to the present invention;

DETAILED DESCRIPTION

Figure 1:
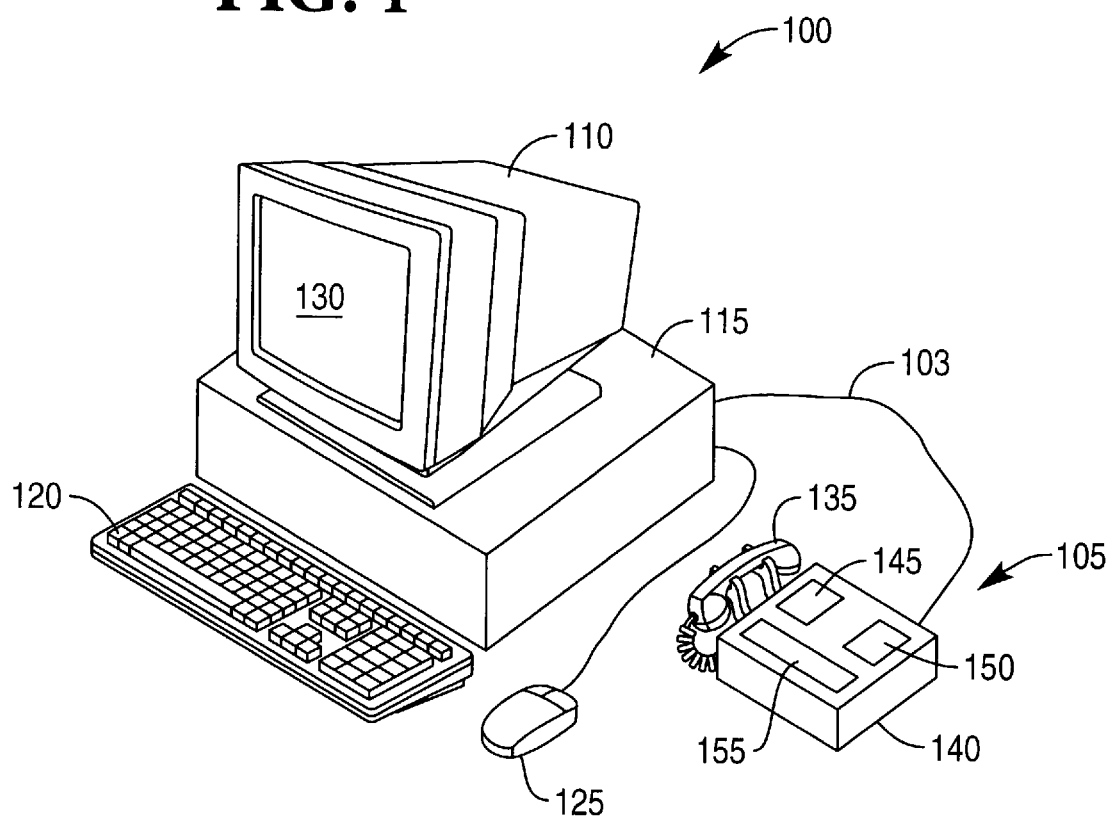
FIG. 1 illustrates an isometric view of an exemplary computer associated with an exemplary telephony device that may be controlled by the computer according to the principles of the present invention.

Referring initially to FIG. 1, illustrated is an isometric view of an exemplary computer (generally designated 100), such as a personal computer ("PC") for example, that is associated via data bus 103 with an exemplary audio unit, or device, (generally designated 105) that may be controlled by PC 100 according to the principles of the present invention. In an embodiment to be described in greater detail hereinbelow, a software controller is provided, which is associated with PC 100, that monitors and may change operating modes in audio unit 105, such as enabling or disabling echo cancellation for example. Since the present invention is not limited to application in a personal computing environment, FIG. 1 is illustrative only.

Exemplary PC 100 includes a monitor 110, a main chassis 115, within which are various electronic components (some of which are discussed in greater detail with reference to FIG. 2), and a plurality of exemplary conventional user interfaces, including a keyboard 120 and a mouse 125. Monitor 110, keyboard 120 and mouse 125 cooperate to allow communication between PC 100 and a user (not shown).

Monitor 110 may provide an area 130 for display of graphical data under the control of an exemplary graphical user interface ("GUI") operating system (not shown) executing within PC 100, such as MICROSOFT® WINDOWS® or other similar type products, as examples. The GUI operating system may manage division of computer resources among various application tasks executing on PC 100. The GUI operating system is operative to divide area 130 of monitor 110 into a plurality of suitably arranged windows that display data corresponding to each of the application tasks. Each window may suitably be allowed to occupy a portion or an entirety of area 130 presented on monitor 110, depending on the user's wishes. Various ones of the windows may suitably occlude one another, whether in whole or in part.

Exemplary audio unit 105 includes a conventional handset 135 and a main chassis 140 that includes various electronic components (some of which are discussed in greater detail with reference to FIG. 2). Main chassis 140 illustratively includes a control panel 145, a speaker/microphone set 150 and an indicator 155, such as a conventional light emitting diode ("LED") for example. Exemplary speaker/microphone set 150, although illustrated as a single unit, may be split into two units. An exemplary audio unit has been developed by AT&T GLOBAL INFORMATION SOLUTIONS ("AT&T GIS"), INC., now NCR CORPORATION, of Dayton, Ohio, namely, product model AUDIO UNIT II.

Those skilled in the pertinent art will note that the principles of the present invention may be implemented alternatively in any suitable computer processing environment having audio capability, whether micro, mini, mainframe, super or like computers, including multi and parallel processing environments, as well as computer networks. The phrase "computer," as used herein, should be broadly interpreted to include stand-alone computers as well as networks of computers.

Before undertaking more detailed discussions of a preferred embodiment of the present invention, the meaning of the following terms and phrases should be understood: the term "or" is inclusive, meaning and/or; the term "include" and derivatives thereof mean inclusion without limitation; and the phrase "associated with" and derivatives thereof may mean to include within, interconnect with, contain, be contained within, connect to or with, couple to or with, be communicable with, juxtapose, cooperate with, interleave, be a property of, be bound to or with, have, have a property of, or the like.

Figure 2:
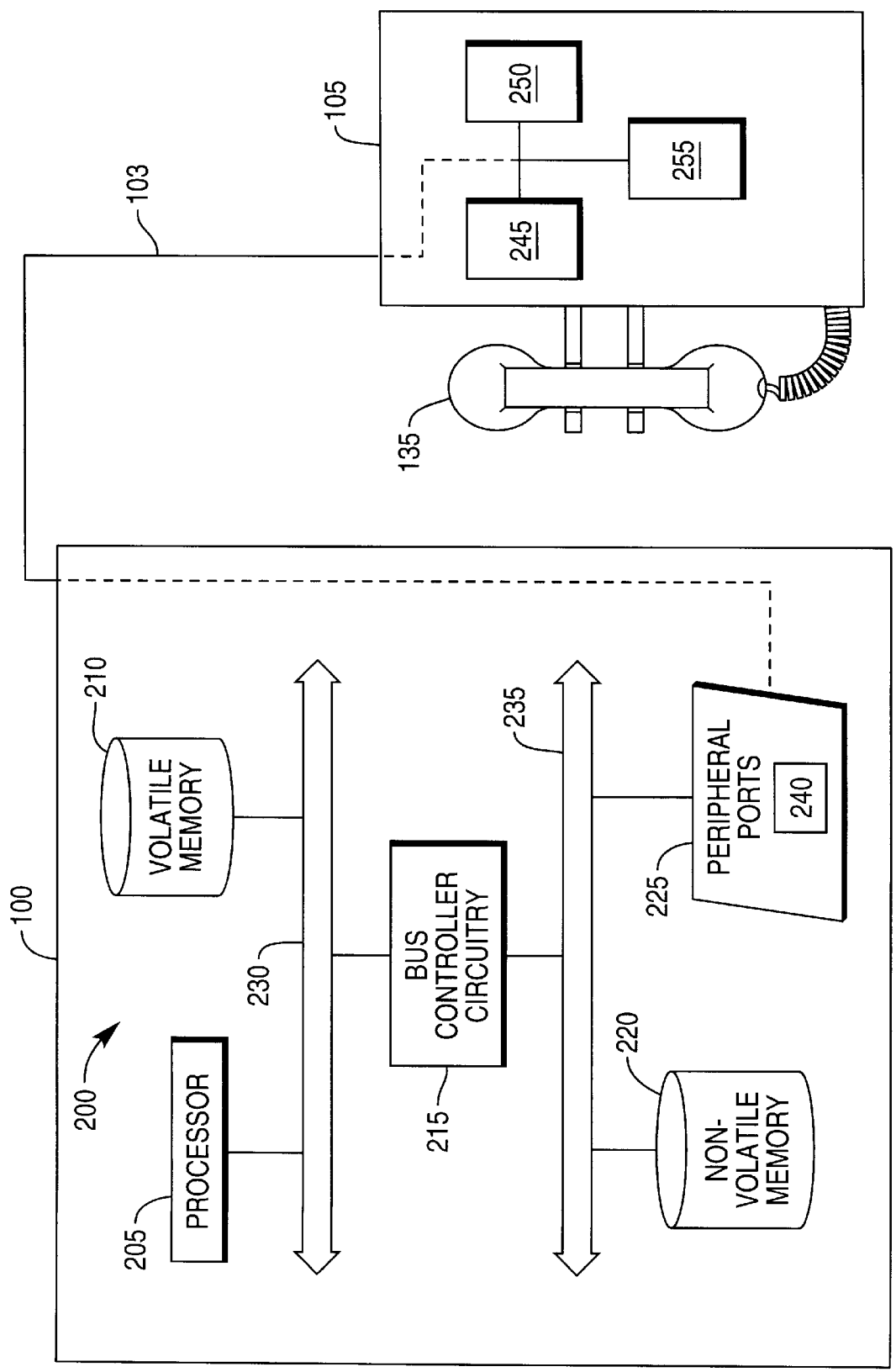
FIG. 2 illustrates a more detailed block diagram of the exemplary computer and telephony device of FIG. 1 according to one embodiment of the present invention.

Turning now to FIG. 2, illustrated is a more detailed block diagram of exemplary PC 100 and audio unit 105 according to one embodiment of the present invention. Exemplary PC 100 illustratively includes processing circuitry (generally designated 200) that includes a processor 205, conventional volatile memory (e.g., random access memory) 210, bus controller circuitry 215, a conventional non-volatile memory (e.g., read only memory or a hard disk drive) 220 and a set of peripheral ports 225. An exemplary host bus 230 is shown that associates processor 205, volatile memory 210 and bus controller circuitry 215. An exemplary input/output ("I/O") bus 235 is shown that associates bus controller circuitry 215, non-volatile memory 220 and set of peripheral ports 225.

Bus controller circuitry 215 provides suitable means by which host bus 230 and I/O bus 235 may be associated, thereby providing a path and management for communication therebetween. Each of the illustrated buses 230 and 235, as well as any other bus described herein, requires a drive current to carry signals thereon. The illustrative circuit accordingly operates in conjunction with a conventional system controller (not shown) that supplies the required drive current. While the illustrated processing circuitry includes a dual-bus configuration, alternate embodiments may include single-bus or greater than two-bus configurations.

Exemplary set of peripheral ports 225 may include peripheral/adapter cards/boards and may operate to couple I/O bus 235 to any one or more of a plurality of conventional peripheral devices for communication therewith, such as exemplary audio unit 105 for example. These peripheral/adapter cards/boards may be suitably associated with the remainder of exemplary processing circuitry 200 via a conventional ISA, MCA, EISA or like expansion slot for example. The peripheral/adapter card and, more particularly, the controller portion associated with the same may suitably allow PC 100 to control the controller.

FIG. 2, like FIG. 1, is also illustrative only—the elements of the present embodiment may therefore take alternate forms. Software, for example, may be replaced by or combined with hardware or firmware, and vice versa. Thus, the terms "circuit," "circuitry" and derivatives thereof are accordingly defined broadly, meaning not only traditional hardware configurations, but also circuitry resulting from software executing within a processor, combinations of hardware and software (firmware), or the like.

Exemplary PC 100 and audio unit 105 collectively function, via a conventional telephony card 240 (e.g., a modem card), as a telephony instrument according to the principles of the present invention. According to a preferred embodiment, telephony card 240 is a conventional VISTIUM BOARD (developed and distributed by AT&T GIS, INC., now NCR CORPORATION), that includes a modifiable software controller.

Exemplary audio unit 105 illustratively includes first and second circuitry 245 and 250, respectively, and echo cancellation circuitry 255 (according to the preferred VISTIUM BOARD embodiment, telephony card 240 includes exemplary echo cancellation circuitry 255 and not audio unit 105). Exemplary circuitry 245–255, and, more generally, audio unit 105, are associated with PC 100 via data bus 103. Exemplary data bus 103 includes each of a user data bus and a control bus according to the present invention. The user data bus may be suitably used to communicate one of at least four "normal" (conventional) states from audio unit 105 to telephony card 240. The control bus may be suitably used to communicate one of at least two control states from telephony card 240 to audio unit 105. Although data bus 103 is illustratively discussed in terms of two separate buses, namely, the user data bus and the control bus, data bus 103 may be a single bi-directional bus that functions as both the user data bus and the control bus.

Exemplary control panel 145 of audio unit 105 includes conventional volume up, volume down and mute controls (not shown). According to TABLE 1 below, the user data bus portion of data bus 103 includes each of an up drive line and a down drive line for communicating two bits of digital data (four normal states) in parallel to telephony card 240. Exemplary first circuitry 245 is operative to place the user data bus into one of the four predetermined states:

| UP DRIVE | DOWN DRIVE | INDICATION |
| --- | --- | --- |
| 0 | 0 | mute on/off (toggle) |
| 0 | 1 | volume increase |

-continued

| UP DRIVE | DOWN DRIVE | INDICATION |
| --- | --- | --- |
| 1 | 0 | volume decrease |
| 1 | 1 | idle |

Those of skill in the art will understand the use of a conventional inverter circuit, as is evidenced in TABLE 1.

In a most preferred embodiment, AUDIO UNIT II is a succeeding device to its predecessor, AUDIO UNIT I. AUDIO UNIT I was associable with the VISTIUM BOARD and also provided the above-described functionality. The VISTIUM BOARD/AUDIO UNIT I product was accepted and established as a base product line. AUDIO UNIT II is more robust, introducing handset-type functionality that temporarily disables echo cancellation circuitry 155 which is used during hands-free operation—recall that according to the preferred VISTIUM BOARD embodiment, echo cancellation circuitry is included with telephony card 240, although the illustrated embodiment associates the same with audio unit 105.

According to either embodiment, volume logic circuitry may be associated with first circuitry 245 and used to increase the volume of, decrease the volume of or mute the audio signal transmitted by AUDIO UNIT II. While increasing or decreasing volume, exemplary indicator 145 may advantageously indicate enablement of the same, such as blinking LED 155 for example. Conventional volume logic circuitry may suitably incorporate an auto repeat function for the volume up and volume down controls, such as when held down (continuously engaged) for example.

Additional processing may occur in response to enabling exemplary speaker/microphone set 150. For example, if audio unit 105 is enabled and handset 135 is placed or remains on a suitable switch hook (not shown), a headphone (not shown) is not plugged in, the mute controls are engaged×number of times during time interval t, or the like, then audio unit 105 may suitably change operating modes, such as signaling on/off conditions or enabling echo cancellation via echo cancellation circuitry 255, for example. Most preferably, first circuitry 245, in response to enabling exemplary speaker/microphone set 150, places the user data bus into a "mute" state (drive up equal to zero, drive down equal to zero), communicating the same to telephony card 240.

The telephony instrument uses a state machine (an exemplary embodiment is discussed with reference to FIGS. 3 to 9) to monitor and control the operating modes of audio unit 105.

According to the illustrated embodiment, the software controller of telephony card 240 is responsive to the predetermined states communicated from audio unit 105 (first circuitry 245) via data bus 103 (the user data bus). Whenever a "mute" signal (drive up equal to zero, drive down equal to zero) is received by the telephony card 240, the software controller places data bus 103, and, more particularly, the control bus, into one of the two selected control states and communicates the same to audio unit 105. The control state functions as a query, namely, indicating which of the mute control or speaker/microphone set 150 has been engaged.

According to the illustrated embodiment, the control bus has at least two functions, namely, communicating the selected control states set forth above, and controlling indicator 155, such as the blinking LED for example. Exemplary second circuitry 250, in response to the control signal communicated from the controller via the control bus, detects the selected state and, in response thereto, places the user data bus in a second predetermined state. The second predetermined state indicates whether the first predetermined state was intended to be a selected one of the four normal states (e.g., engagement of the mute control) or one of at least two mode-controlling alternate states (e.g., engagement of speaker/microphone set 150). This control scheme allows the user data bus and the control bus (data bus 103) to cooperate to provide an at least six state sequential output to allow the operating modes of audio unit 105 to be monitored and controlled without modifying the bus drive circuitry, and more particularly, as related to the VISTIUM BOARD product line, to continue to use the established hardware base through modification of a software controller.

If speaker/microphone set 150 has been engaged, echo cancellation circuitry 255 may be suitably enabled. In a related embodiment, the at least two mode-controlling alternate states may include echo cancellation enable and echo cancellation disable states.

As set forth hereinabove, the user data bus and the control bus cooperate to provide, in essence, an "extension" to the user data bus. The "extension" allows the user data bus to achieve a greater number of states than would otherwise be possible. By extending the capabilities of the user data bus, the present invention allows the telephony instrument to include new features without having to redesign either the user data bus or the bus drive circuitry (perhaps interrupt driving circuitry) that is already present within the telephony instrument. In a four-state user data bus, up to three mode-controlling alternate states are possible, inasmuch as one of the alternate states is reserved to indicate whether the second circuit is operating with normal states or alternate states.

In an advantageous embodiment, status information or commands may be communicated between the controller and audio unit 105, and, more particularly, second circuitry 250, concerning enablement or disablement of echo cancellation circuit 255. Alternatively, other circuitry may be monitored or controlled via the present invention.

In alternate embodiments, the illustrated circuitry may, in whole or in part, be replaced by or combined with any suitable processing configuration, including multi and parallel processing configurations, programmable logic devices, such as programmable array logic ("PALS") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs"), or the like, to form the various types of circuitry, controllers and systems described and claimed herein.

Conventional computer system architecture is more fully discussed in *The Indispensable PC Hardware Book,* by Hans-Peter Messmer, Addison Wesley (2nd ed. 1995) and *Computer Organization and Architecture,* by William Stallings, MacMillan Publishing Co. (3rd ed. 1993); conventional computer, or communications, network design is more fully discussed in *Data Network Design,* by Darren L. Spohn, McGraw-Hill, Inc. (1993); and conventional data communications is more fully discussed in *Voice and Data Communications Handbook,* by Bud Bates and Donald Gregory, McGraw-Hill, Inc. (1996), *Data Communications Principles,* by R. D. Gitlin, J. F. Hayes and S. B. Weinstein, Plenum Press (1992) and *The Irwin Handbook of Telecommunications,* by James Harry Green, Irwin Professional Publishing (2nd ed. 1992). Each of the foregoing publications is incorporated herein by reference for all purposes.

Figure 3:
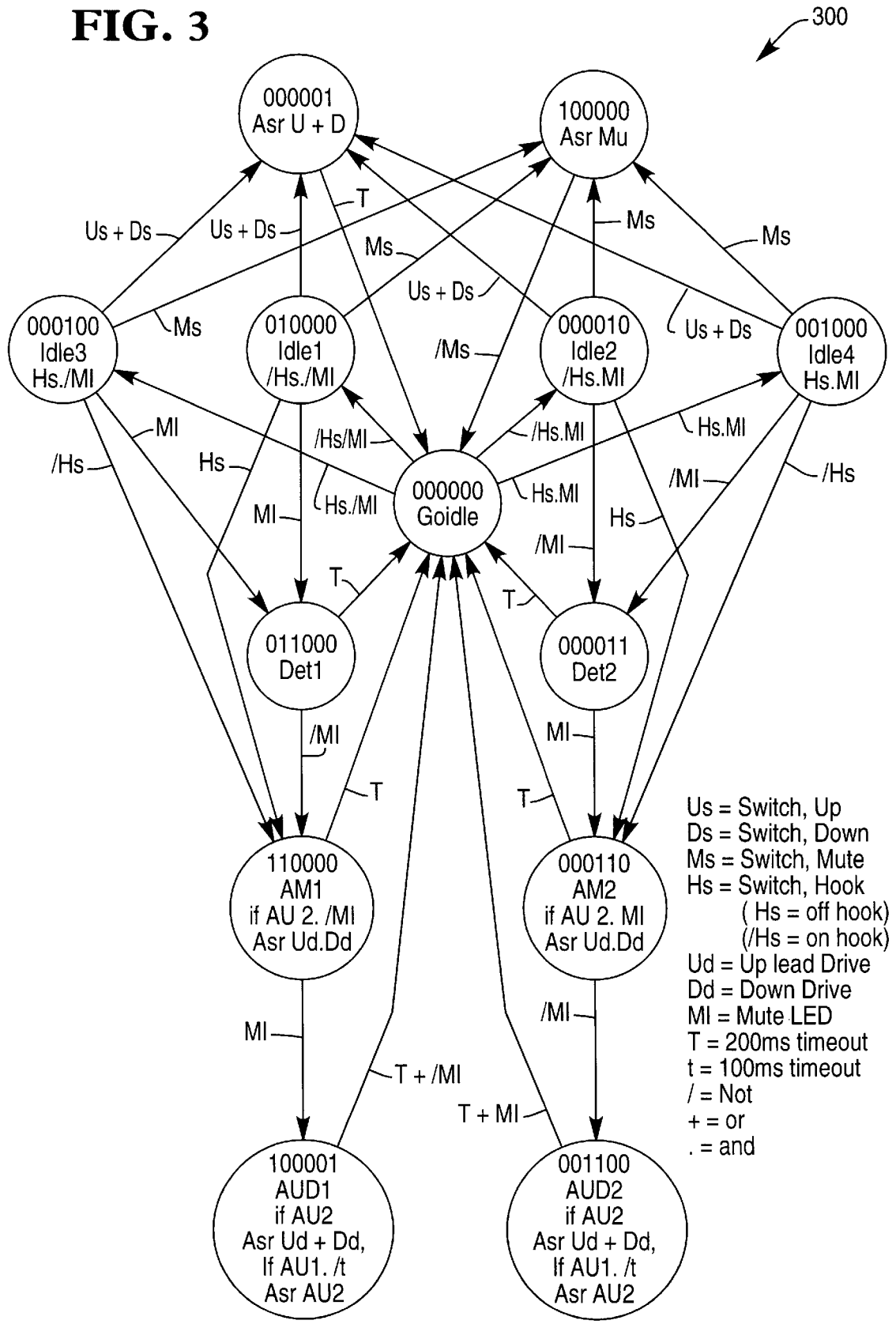
FIG. 3 illustrates an exemplary state diagram implementing volume control and switch hook signaling logic that may be associated with one embodiment of the present invention.

Turning now to FIG. 3, illustrated is an exemplary state diagram (generally designated 300) implementing volume control and switch hook signaling logic that may be associated with the VISTIUM BOARD/AUDIO UNIT II implementation according to the present invention. For the purposes of illustration, the following table of acronyms is used:

TABLE 2

| SYMBOL | DEFINITION |
| --- | --- |
| Us | Switch up |
| Ds | Switch down |
| Ms | Switch mute |
| Hs | Switch hook (Hs = off-hook; /Hs = on-hook) |
| Ud | Up lead drive |
| Dd | Down lead drive |
| Ml | Mute LED |
| T | 200 ms timeout |
| t | 100 MS timeout |
| / | Not |
| + | Or |
| ● | And |

FIG. 3 is discussed with reference to FIGS. 4 through 9, which illustrate exemplary switch scenarios for volume up, volume down and mute initiated by ones of the switches of the VISTIUM BOARD/AUDIO UNIT II embodiment.

According to an exemplary embodiment, the illustrated state machine is associated with and forms a part of AUDIO UNIT II—AUDIO UNIT II being the successor to predecessor audio units, such as AUDIO UNIT I. AUDIO UNIT II is most preferably compatible with such predecessor audio units and software associated with the same—thereby facilitating easier replacement and repair of such predecessor audio units without a software upgrade (the intent is to discontinue the manufacture of predecessor audio units). Most preferably, when powered up AUDIO UNIT II works substantially like a predecessor audio unit, such as AUDIO UNIT I:

1. AUDIO UNIT II does not signal the switch hook state whenever a state changes (there most preferably is a flip-flop that is power on reset into predecessor AUDIO UNIT I mode, with this flip-flop reset a change of switch hook state causes the illustrated state machine to execute substantially like AUDIO UNIT I, with the outputs that drive the mute, volume up, and volume down states inhibited).

2. To set the AUDIO UNIT II mode flip-flop, a software controller is most preferably provided that scans the state of the switch hook. With the flip-flop reset, the AUDIO UNIT II will not output mute, volume up or volume down states thereby, in response to a switch hook scan, forcing the illustrated state machine to one of state "100001" or "001100." This operation most preferably occurs within 100 ms. Executing either state will set the AUDIO UNIT II flip-flop. A second scan switch hook sequence, also driven by the software controller, will trigger an output sequence mute, volume up or volume down status of the switch hook confirming that the unit is AUDIO UNIT II and is operational.

Turning now to FIG. 4, illustrated is an exemplary timing diagram (generally designated 400) illustrating an up switch scenario of the VISTIUM BOARD/AUDIO UNIT II implementation according to the present invention. To begin, the up switch goes "active," meaning that the state machine goes from one of the exemplary idle states to assert Ud (Up lead drive). Up lead drive is asserted for 200 ms and M1 (Mute LED) is toggled twice by the VISTIUM BOARD within that time. A 200 ms timer times out with no volume switch active, causing the state machine to go to an appropriate idle state.

Turning now to FIG. 5, illustrated is an exemplary timing diagram (generally designated 500) illustrating a down switch with repeat scenario of the VISTIUM BOARD/AUDIO UNIT II implementation according to the present invention. To begin, the down switch goes "active," meaning that the state machine goes from one of the exemplary idle states to assert Dd (Down lead drive). Down lead drive is asserted for 200 ms and M1 (Mute LED) is toggled twice by the VISTIUM BOARD within that time. A 200 ms timer times out with Ds (Down volume switch) active, causing the state machine to go to an appropriate idle state for one clock and then back to assert Dd for 200 ms. After sequence repeats state machine 300 goes to an appropriate idle state.

Figure 6:
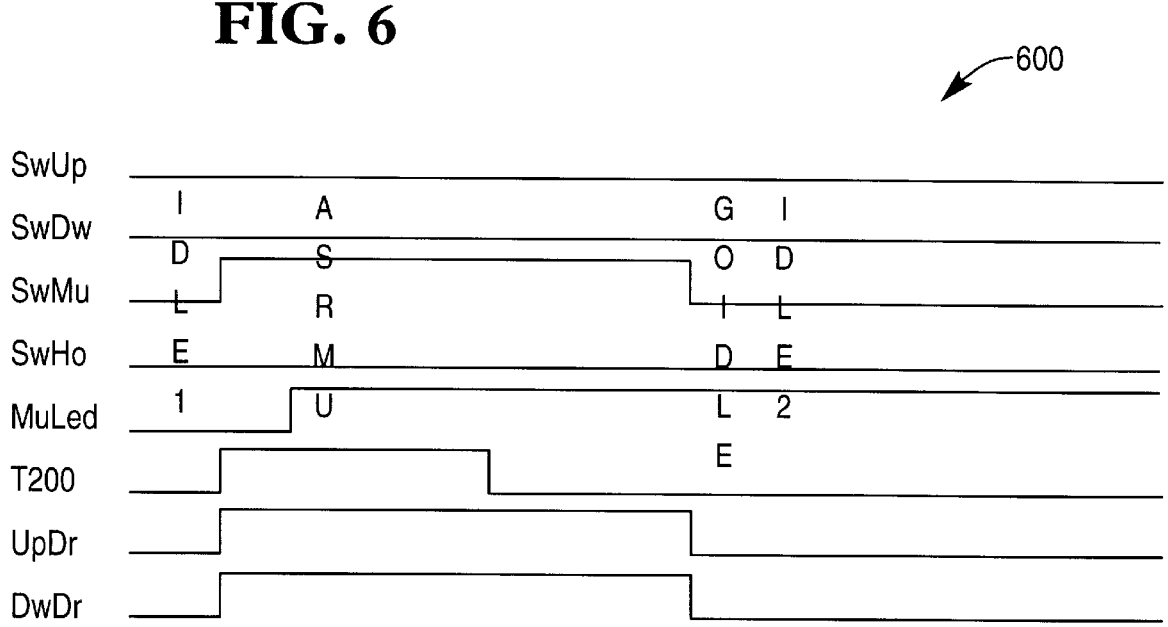
FIG. 6 illustrates an exemplary timing diagram illustrating a mute switch scenario according to the present invention.

Turning now to FIG. 6, illustrated is an exemplary timing diagram (generally designated 600) illustrating a mute switch scenario of the VISTIUM BOARD/AUDIO UNIT II implementation according to the present invention. To begin, the mute switch goes "active," meaning state machine 300 goes from one of the exemplary idle states to assert mute drive comprised of Drive Up and Drive Down. Mute drive may stay suitably active while the mute switch is active and may not be affected by the 200 ms timer. The Mute LED is toggled by the VISTIUM BOARD after mute drive is asserted. This action determines if the sequence is just a mute or if switch hook information is being transmitted. If switch hook information is being transmitted, then the state of the Up Drive and Down Drive may change after the Mute LED state changes. Once the Mute switch is released, then the state goes to the "GO IDLE" state and then to the appropriate idle state which in this case is IDLE 2. Note that each time the Mute switch is pressed the state of the Mute LED may be toggled.

Figure 7:
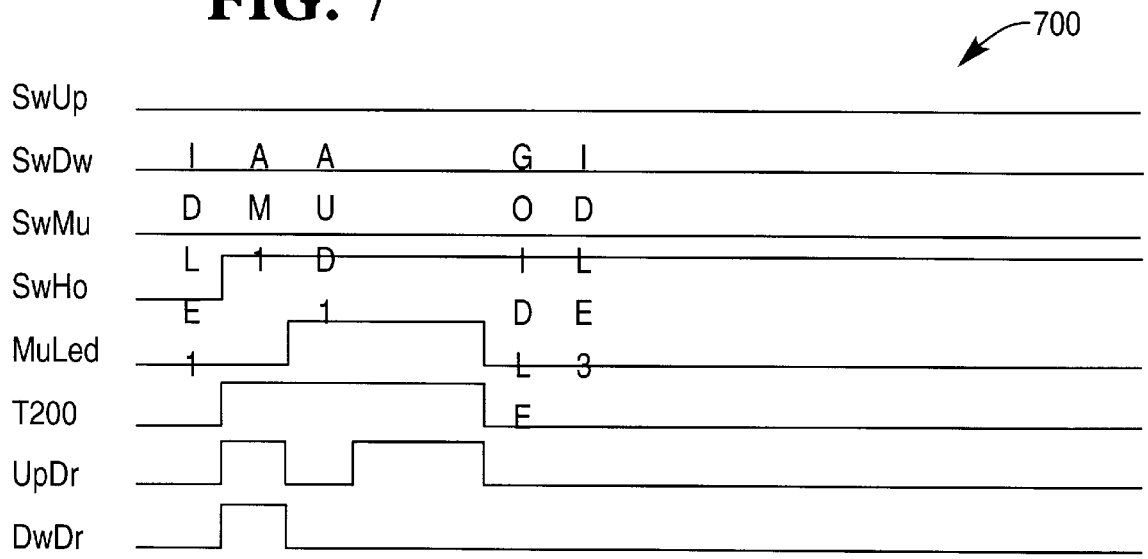
FIG. 7 illustrates an exemplary timing diagram illustrating an off-hook change scenario according to the present invention.

Turning now to FIG. 7, illustrated is an exemplary timing diagram (generally designated 700) illustrating an off-hook change with MUTE LED off scenario of the VISTIUM BOARD/AUDIO UNIT II implementation according to the present invention. To begin, the hook switch changes to "off-hook," meaning that the state machine goes from one of the exemplary idle states to assert Ud (Up lead drive) and Dd (Down lead drive). Up lead drive and Down lead drive is asserted for a maximum of 200 ms after which time the sequence times out if M1 (Mute LED) has not changed states. If Mute LED is toggled by VISTIUM BOARD within 200 ms both leads are dropped for one clock and then Up lead drive is asserted. The state machine goes to an appropriate idle state.

Figure 8:
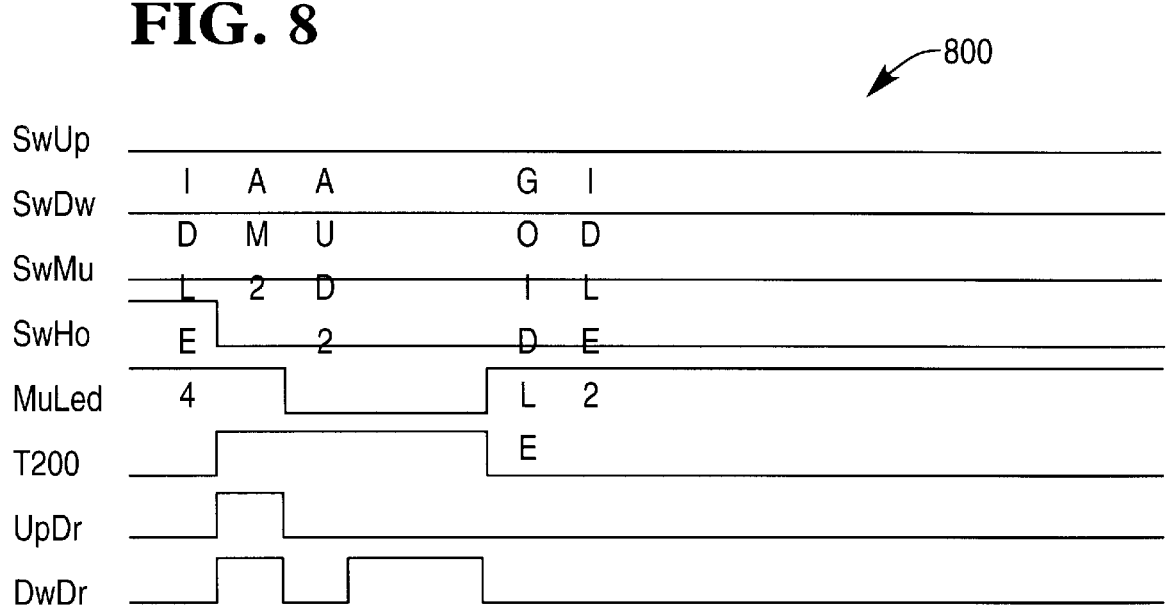
FIG. 8 illustrates an exemplary timing diagram illustrating an off-hook change with mute lead on scenario according to the present invention.

Turning now to FIG. 8, illustrated is an exemplary timing diagram (generally designated 800) illustrating an off-hook change with mute led on scenario of the VISTIUM BOARD/AUDIO UNIT II implementation according to the present invention. To begin, the hook switch changes to "on-hook," meaning that the state machine goes from one of the exemplary idle states to assert Ud (Up lead drive) and Dd (Down lead drive). Up lead drive and Down lead drive is asserted for a maximum of 200 ms after which time the sequence times out if M1 (Mute LED) has not changed states. If Mute LED is toggled by VISTIUM BOARD within 200 ms both leads are dropped for one clock and then Down lead drive is asserted. The state machine goes to an appropriate idle state.

Figure 9:
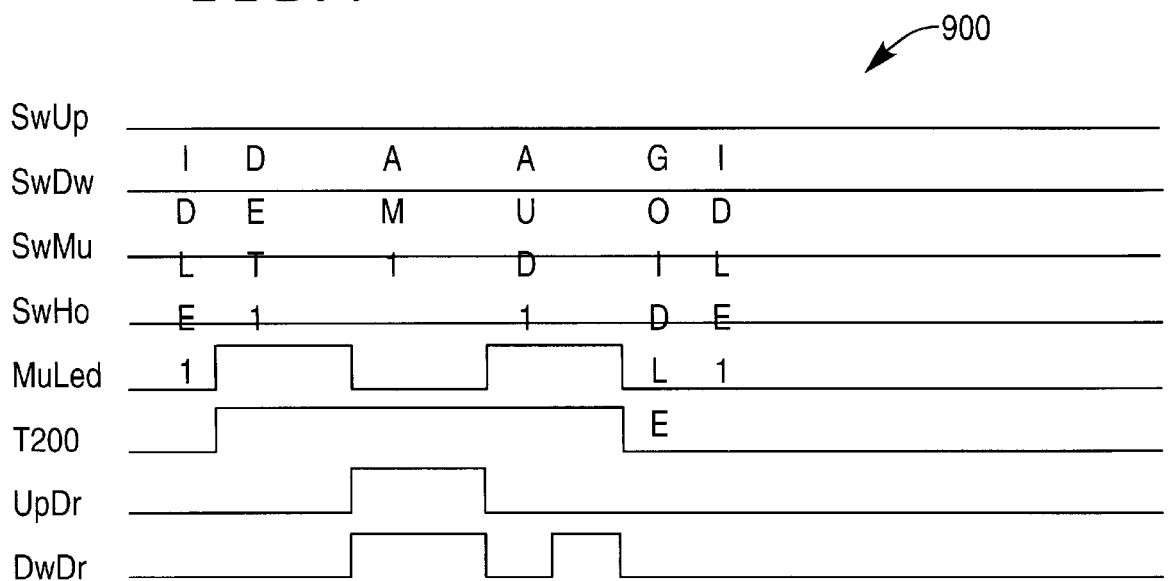
FIG. 9 illustrates an exemplary timing diagram illustrating a scan hook state scenario according to the present invention.

Turning lastly to FIG. 9, illustrated is an exemplary timing diagram (generally designated 900) illustrating a scan hook state scenario of the VISTIUM BOARD/AUDIO UNIT II implementation according to the present invention. To begin, M1 (Mute LED) is toggled twice by VISTIUM BOARD. The state machine goes from one of the exemplary idle states to assert Ud (Up lead drive) and Dd (Down lead drive). Up lead drive and Down lead drive is asserted until Mute LED is toggled for a third time by VISTIUM BOARD, after which time both leads are dropped for one clock and then Up lead drive or Down lead drive are asserted depending on the hook state. If the 200 ms timer times out at any time the sequence is ended. If Mute LED is toggled for a fourth time by VISTIUM BOARD, the state machine goes to an appropriate idle state.

From the above description, it is apparent that the present invention provides, for use with a telephony instrument having controller and audio unit portions with associated bus drive circuitry, the controller and audio unit portions couplable together by a user data bus having four normal states and a two state control bus, a state machine and method, associated with the audio unit portion, that allows operating modes of the telephony instrument to be monitored and controlled. The system includes: (1) a first circuit that places the user data bus in a first predetermined state, the controller portion responding to the predetermined state by placing the control bus in a selected state and (2) a second circuit, coupled to the first circuit, that detects a presence of the selected state and, in response thereto, places the user data bus in a second predetermined state, the second predetermined state indicating whether the first predetermined state was intended to be a selected one of the four normal states or one of at least two mode-controlling alternate states, the state machine thereby allowing the user data bus and the control bus to cooperate to provide an at least six state sequential output to allow the operating modes to be monitored and controlled without modifying the bus drive circuitry.

Although the present invention has been described in detail, those skilled in the art should understand that they can make various changes, substitutions and alterations herein without departing from the spirit and scope of the invention in its broadest form.

What is claimed is:

1. For use with a telephony instrument having controller and audio unit portions with associated bus drive circuitry, said controller and audio unit portions couplable together by a user data bus having four audio states and a control bus, a state machine, associated with said audio unit portion, that allows operating modes of said telephony instrument to be monitored and controlled, comprising:

a first circuit that places said user data bus in a first predetermined state, said controller portion responding to said predetermined state by placing said control bus in a selected state; and a second circuit, coupled to said first circuit, that detects a presence of said selected state and, in response thereto, places said user data bus in a second predetermined state, said second predetermined state identifying a selected one of at least two mode control states and said four audio states to which said first predetermined state corresponds, said state machine thereby allowing said user data bus and said control bus to cooperate to provide an at least six state sequential output to allow said operating modes to be monitored and controlled without modifying said bus drive circuitry.

2. The state machine as recited in claim 1 wherein said telephony instrument further has an echo cancellation circuit associated therewith and said at least two mode control states indicate whether said echo cancellation circuit is enabled.

3. The state machine as recited in claim 1 wherein said controller portion is embodied in a peripheral card couplable to a computer system to allow said computer system to control said controller portion.

4. The state machine as recited in claim 1 wherein said control bus controls a status light associated with said audio unit portion.

5. The state machine as recited in claim 1 wherein said four audio states are:
   mute on/off,
   volume increase,
   volume decrease, and
   idle.

6. The state machine as recited in claim 1 wherein said first predetermined state is a mute on/off state and said second predetermined state is said mute on/off state to indicate that said first predetermined state was intended to be said mute on/off state.

7. The state machine as recited in claim 1 wherein said at least two mode control states include echo cancellation enable and echo cancellation disable states.

8. For use with a telephony instrument having controller and audio unit portions with associated bus drive circuitry, said controller and audio unit portions couplable together by a user data bus having four audio states and a control bus, a method of allowing operating modes of said telephony instrument to be monitored and controlled, comprising the steps of:
   placing said user data bus in a first predetermined state, said controller portion responding to said predetermined state by placing said control bus in a selected state;
   detecting a presence of said selected state; and
   in response thereto, placing said user data bus in a second predetermined state, said second predetermined state identifying a selected one of at least two mode control states and said four audio states to which said first predetermined state corresponds, thereby to allow said user data bus and said control bus to cooperate to provide an at least six state sequential output to allow said operating modes to be monitored and controlled without modifying said bus drive circuitry.

9. The method as recited in claim 8 wherein said telephony instrument further has an echo cancellation circuit associated therewith and said at least two mode control states indicate whether said echo cancellation circuit is enabled.

10. The method as recited in claim 8 wherein said controller portion is embodied in a peripheral card couplable to a computer system, said method further comprising the step of controlling said controller portion with said computer system.

11. The method as recited in claim 8 further comprising the step of controlling a status light associated with said audio unit portion with said control bus.

12. The method as recited in claim 8 wherein said four audio states are:
   mute on/off,
   volume increase,
   volume decrease, and
   idle.

13. The method as recited in claim 8 wherein said first predetermined state is a mute on/off state and said second predetermined state is said mute on/off state to indicate that said first predetermined state was intended to be said mute on/off state.

14. The method as recited in claim 8 wherein said at least two mode control states include echo cancellation enable and echo cancellation disable states.

15. A telephony instrument, comprising:
   a controller portion having bus drive circuitry associated therewith, said controller portion embodied in a peripheral card couplable to a computer system to allow software executable in said computer system to control said controller portion;
   an audio unit portion having user interface circuitry;
   a user data bus, having four audio states, coupling said bus drive circuitry and said audio unit portion;
   a control bus coupling said bus drive circuitry and said audio unit portion; and
   a state machine, associated with said audio unit portion, that allows operating modes of said telephony instrument to be monitored and controlled, said state machine including:
      a first circuit that places said user data bus in a first predetermined state, said controller portion responding to said predetermined state by placing said control bus in a selected state; and
      a second circuit, coupled to said first circuit, that detects a presence of said selected state and, in response thereto, places said user data bus in a second predetermined state, said second predetermined state identifying a selected one of at least two mode control states and said four audio states to which said first predetermined state corresponds, said state machine thereby allowing said user data bus and said control bus to cooperate to provide an at least six state sequential output to allow said operating modes to be monitored and controlled without modifying said bus drive circuitry.

16. The telephony instrument as recited in claim 15 wherein said telephony instrument further has an echo cancellation circuit associated therewith and said at least two mode control states indicate whether said echo cancellation circuit is enabled.

17. The telephony instrument as recited in claim 15 wherein said control bus controls a status light associated with said audio unit portion.

18. The telephony instrument as recited in claim 15 wherein said four audio states are:
   mute on/off,
   volume increase,
   volume decrease, and
   idle.

19. The telephony instrument as recited in claim 15 wherein said first predetermined state is a mute on/off state and said second predetermined state is said mute on/off state to indicate that said first predetermined state was intended to be said mute on/off state.

20. The telephony instrument as recited in claim 15 wherein said at least two mode control states include echo cancellation enable and echo cancellation disable states.

* * * * *